United States Patent
Zhao et al.

(10) Patent No.: US 9,591,500 B2
(45) Date of Patent: Mar. 7, 2017

(54) MEASUREMENT REPORTING METHOD AND DEVICE IN CARRIER AGGREGATION SYSTEM

(75) Inventors: Yi Zhao, Beijing (CN); Jing Liang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 135 days.

(21) Appl. No.: 13/514,261

(22) PCT Filed: Nov. 24, 2010

(86) PCT No.: PCT/CN2010/079080
§ 371 (c)(1),
(2), (4) Date: Jun. 6, 2012

(87) PCT Pub. No.: WO2011/069410
PCT Pub. Date: Jun. 16, 2011

(65) Prior Publication Data
US 2012/0244905 A1    Sep. 27, 2012

(30) Foreign Application Priority Data
Dec. 8, 2009   (CN) .......................... 2009 1 0242279

(51) Int. Cl.
*H04B 7/00*  (2006.01)
*H04W 24/10*  (2009.01)
*H04L 5/00*  (2006.01)

(52) U.S. Cl.
CPC ............. *H04W 24/10* (2013.01); *H04L 5/001* (2013.01); *H04L 5/0091* (2013.01)

(58) Field of Classification Search
USPC ...................... 455/522, 69–70; 370/315–320
See application file for complete search history.

(56) References Cited

U.S. PATENT DOCUMENTS

2009/0122730 A1* 5/2009 Yang et al. .................... 370/280
2009/0247150 A1 10/2009 Fischer et al.
(Continued)

FOREIGN PATENT DOCUMENTS

CN    1429033 A    7/2003
CN  101426224 A    5/2009
(Continued)

OTHER PUBLICATIONS

International Search Report Issued in International Application No. PCT/CN2010/079080 dated Mar. 10, 2011.
(Continued)

*Primary Examiner* — Fayyaz Alam
(74) *Attorney, Agent, or Firm* — Handal & Morofsky, LLC (57) ABSTRACT

Provided in the embodiments of the present invention are a measurement reporting method and device in a CA system. The method includes: UE receives the message from the network side; according to the message, the said UE judges the component carriers and/or measurement object whether meet the condition of triggering measurement reporting or not; when result is true, UE reports measurement information of at least one component carrier and/or measurement information of at least one measurement object to the network side by measurement report message. In the invention, the UE can report the measurement information of multiple carriers and/or frequencies together, therefore, it simplifies the reporting process, reduces the system time delay, and makes the network side easier to perform carrier management for LTE-A UE.

14 Claims, 5 Drawing Sheets

(56) References Cited

U.S. PATENT DOCUMENTS

| | | | |
|---|---|---|---|
| 2010/0267394 A1* | 10/2010 | Wu | 455/450 |
| 2011/0081903 A1* | 4/2011 | Cai et al. | 455/424 |
| 2011/0103249 A1* | 5/2011 | Kim et al. | 370/252 |
| 2012/0002643 A1* | 1/2012 | Chung et al. | 370/331 |
| 2012/0244903 A1* | 9/2012 | Fong et al. | 455/517 |

FOREIGN PATENT DOCUMENTS

| | | |
|---|---|---|
| CN | 101932045 A | 12/2010 |
| JP | 202531139 A | 12/2012 |
| JP | 2012531136 A | 12/2012 |
| WO | 2010113490 A1 | 10/2010 |
| WO | 2010130196 A1 | 11/2010 |
| WO | 2010148961 A1 | 12/2010 |

OTHER PUBLICATIONS

Office Action Issued in Chinese Patent Application No. 200910242279.3, dated Nov. 1, 2012 (In Chinese).
Office Action Issued in Chinese Patent Application No. 200910242279.3, dated Nov. 1, 2012 (In English).
Office Action Issued in Chinese Patent Application No. 200910242279.3, dated Jul. 9, 2013 (In Chinese).
Notification of Reasons for Refusal issued in Japanese Patent Application No. 2012-541305, dated Sep. 3, 2013 (In Japanese).
Notification of Reasons for Refusal issued in Japanese Patent Application No. 2012-541305, dated Sep. 3, 2013 (In English).
Office Action issued in Korean Patent Application No. 10-2012-7010745, dated Sep. 5, 2013 (In Korean).
Office Action issued in Korean Patent Application No. 10-2012-7010745, dated Sep. 5, 2013 (In English).
3GPP TSG-RAN2 Meeting #68, R2-097017, LG Electronics Inc., Measurement configuration structure for carrier aggregation, dated Nov. 9-14, 2009.
Office Action Issued in Chinese Patent Application No. 200910242279.3, dated Jul. 9, 2013 (In Chinese).
Office Action Issued in Chinese Patent Application No. 200910242279.3, dated Nov. 1, 2012 (In English).
3GPP TSG-RAN2 Meeting #68, R2-097017, LG Electronics Inc,, Measurement configuration structure for carrier aggregation, dated Nov. 9-14, 2009.

* cited by examiner

MEASUREMENT REPORTING METHOD AND DEVICE IN CARRIER AGGREGATION SYSTEM

The priority of the Chinese patent application with the application date of Dec. 8, 2009, the application number of 200910242279.3, and the patent name of "method and device for measurement reporting in CA system, all content of the priority application are combined into the present application by quoting.

FIELD OF THE PRESENT INVENTION

The present invention relates to the field of mobile communication technology, and more particularly to the method and device for measurement reporting in CA system.

BACKGROUND OF THE PRESENT INVENTION

Figure 1:
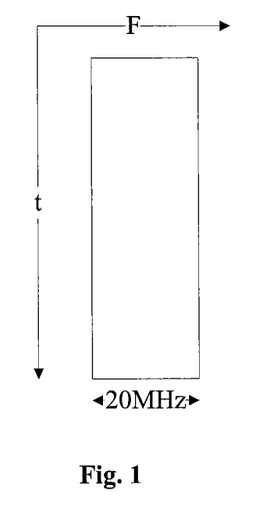
FIG. 1 is a schematic diagram of a cell only which has one carrier in LTE system of the present technology.

LTE (Long Term Evolution) is the evolution of 3G (3rd Generation), it improves and enhances the air access technology of 3G, using OFDM (Orthogonal Frequency Division Multiplexing) and MIMO (Multiple Input Multiple Output) as the only standard of the evolution of wireless network. Wherein, in LTE system and previous wireless communication system, a cell only has a carrier, as shown in FIG. 1, and the max bandwidth is 20 MHz; In 20 MHz spectrum bandwidth, LTE can provide the peak rate of downlink is 100 Mbit/s and the peak rate of uplink is 50 Mbit/s, ameliorating the performance of cell edge users, improving cell capability and reducing system delay. In LTE system, UE (User Equipment) working in one carrier at the same time, while one LTE cell having only one carrier, each LTE cell identified by only one number in network. UE can receives and transmits data only in one cell at the same time, and this cell is called "serving cell" for UE.

In addition, with the rapid growth of the number of mobile user, traffic of mobile user increases exponentially. To satisfy the continuously increased traffic requirements of mobile user, it is need to provide more larger bandwidth for traffic transmission of mobile user and higher peak rate which applications requires. In LTE-A (LTE-Advanced) system, the peak rate has a huge boost than LTE. It requires 1 Gbps for downlink and 500 Mbps for uplink, while, if only using a carrier with the max bandwidth of 20 MHz, it can't reach the requirements of the peak rate. So, LTE-A needs to expand the bandwidth the terminal user used, then introduced CA (Carrier Aggregation) technology. There are multiple cells in which UE receives and sends data through carrier aggregation technology at the same time in the same geographic location, and each cell at least include one (or a pair) carrier(s) which can be used to transmit data independently.

Figure 2:
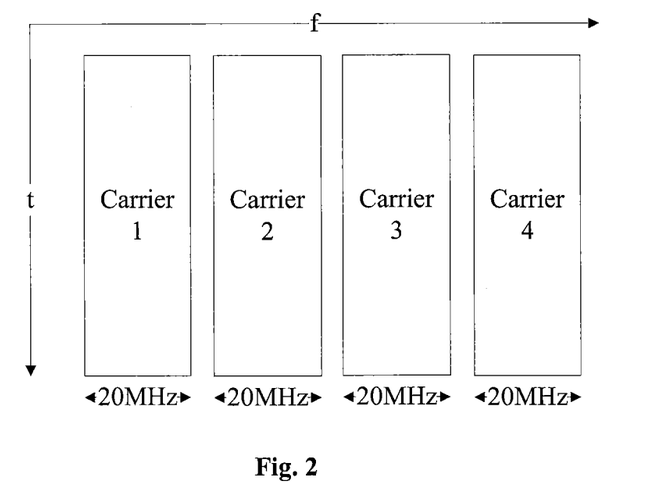
FIG. 2 is a schematic diagram of CA in LTE-A system of the present technology.

Specifically, the multiple aggregated cells can use the same PCI (Physical Layer cell ID), while the carrier frequency and CGI (Cell Global ID) of each cell are different. CGI also can be called ECGI, that is E-UTRAN (Evolved Universal Terrestrial Radio Access Network) cell Global ID. UE can receive and transmit data in multiple (or multiple pairs) carrier of multiple cell sets in which the carriers can be aggregated at the same time, so as to improve data transmission rate. To ensure UE can work in each aggregated carrier, the maximum bandwidth of each carrier can not exceed 20 MHz. The CA technology in LTE-A system is shown in FIG. 2, the base station of LTE-A have four carriers which can be aggregated, the base station can do data transmission in four carriers at the same time with the same UE, to improve the data transmit rate of user.

In LTE-A system, the channel quality of the carriers which can be aggregated needs to be estimated before and during serving process for UE. The base station do the carrier management, and decide whether the carrier which can be aggregated can be used to transmit data. For example, if channel quality of a carrier is better and meet the condition of CA, when a UE need to transmit lots of traffic, the base station can utilize this carrier by CA to provide data transmission service for the UE; if a UE is performing CA transmission, while the channel quality of one aggregated carrier of UE turns bad and does not satisfy the setting condition, then base station can deactivate or delete this carrier, do not use it provide service to UE, and can also activate another carrier which satisfy the setting condition and has better the channel quality, to provide service to UE.

Figure 3:
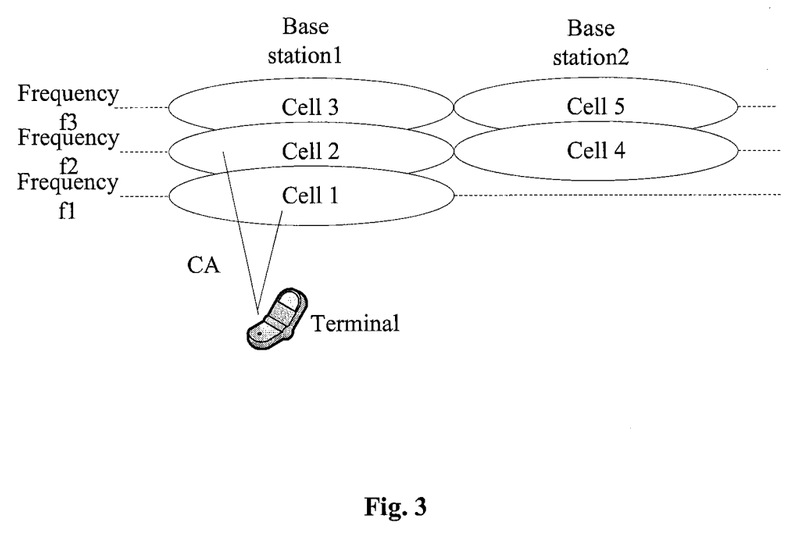
FIG. 3 is a schematic diagram of CA scenarios in LTE-A system of the present technology.

Furthermore, in current LTE-A system, each cell only has one (or a pair) carrier which can work independently, and identified by a unique CGI. As shown in FIG. 3, wherein, carrier frequency of cell1 is f1, carrier frequency of cell2 is f2. These two carriers (corresponding to cell 1 and cell 2, respectively) are aggregated to provide service to a certain terminal. the channel quality of cell 1, cell 2 and cell 3 need to be estimated, so that the base station can do the carrier management to decide whether do carrier aggregation with carriers which can be aggregated to provide better transmission for terminal.

But to the carrier (or called "frequency") (for example, cell4 and cell 5) which can not be aggregated with the working carrier (cell1 and 2), also need to do mobility measurement, so that the base station can perform mobility management (for example, handover or other management operation). Specifically, if the cell 1 and cell 2 of base station 1 have bad channel quality and can not provide service for terminal, while the cell4 and cell 5 of base station2 have better channel quality and can provide service for terminal, the network will switch the terminal from the cell 1 and cell 2 of base station 1 to the cell4 and cell 5 of base station2, that is, through (multicarrier) handover, CA transmission can continue, and the terminal can be provided with high-speed services all the time.

In the present technology, the evaluation of channel quality is base on that in LTE system. Base station sends measurement configuration information to UE through RRC (Radio Resource Control) signalling, UE implements measurement according to the content of the measurement configuration information (that is, estimate the channel quality, including intra-frequency measurements, inter-frequency measurement, inter-RAT measurements and other measurement process), and reports the measurement result to network.

Figure 4:
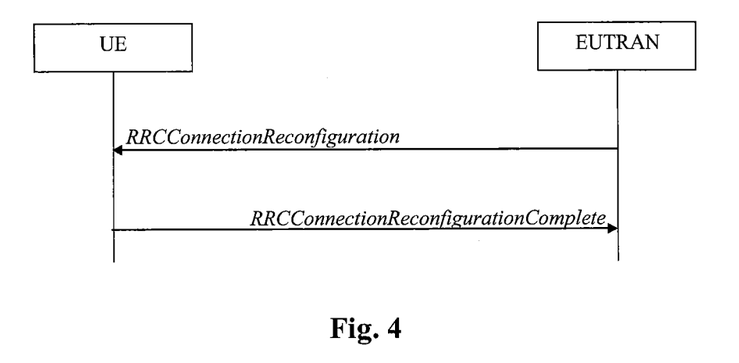
FIG. 4 is a schematic diagram of the process of RRC connection reconfiguration when the network performs measurement configuration in the present technology.

As shown in FIG. 4, the RRC connection reconfiguration process which is used to configure measurement for network, comprising: network side E-UTRAN sends RRC connection reconfiguration message to UE; UE sends RRC connection reconfiguration complete message to E-UTRAN. Wherein, the RRC connection reconfiguration message include: measurement object, report configuration, measurement ID and other parameter.

Corresponding, measurement report has three kinds of trigger type, comprising: event triggered measurement report, periodical triggered measurement report and event triggered periodical measurement report. The said three kinds of trigger type can be distinguished according to combination of various parameters in reporting configuration. For example, when the trigger type in reporting configuration is "event" triggered, and the threshold value of the event and the time which need to be met to trigger a measurement report are also be configured, but if the interval of measurement or number of reports sent does not be configured, UE will report measurement results according to event triggered measurement report with number of reports sent equal to one.

Specifically, each measurement reporting message can only report measurement content corresponding to one measurement ID, that is, only the measurement quantity of UE serving cell and the cell which is corresponding to the frequency indicated by measurement object and meet the requirements of reporting configuration can be reported.

In conclusion, the present technology at least have the follow disadvantages: in multicarrier system, if UE want to perform measurement report for the aggregated component carriers of UE or for the measurement quantity of neighbor cells corresponding to the UE aggregated carriers, the frequency of each carrier or neighbor cell all need to use a measurement reporting message. When multiple UE aggregated component carriers or neighbor cells of multiple frequency need to be reported, it will need many messages to do it. Thus it will increases signalling cost. In addition, because the network side can not obtain the channel information of other component carriers of UE except for the carrier corresponding to the measurement report message, thus it will influence to the management of UE component carrier and handover judgment (mobility management) of UE in CA scenarios.

SUMMARY OF THE PRESENT INVENTION

Embodiments of the present invention provide a method and device of measurement reporting in CA system, to reduce the signalling cost of measurement report in CA systems, and make the network side easier to do carrier management and mobility management for LTE-A UE.

To achieve the purpose, embodiments of the present invention provide a method of measurement reporting in CA system, comprising:

UE receives the message from the network side;

According to the message, the said UE judges the component carrier and/or measurement object whether meet the condition of triggering measurement reporting or not;

When judgment result is true, UE reports measurement information of at least one component carrier and/or measurement information of at least one measurement object to the network side by measurement report message.

Embodiments of the present invention provide a device of measurement reporting in CA system wherein, comprising:

Receiver module, used for receiving message from the network side;

Judgment module, used for judging the component carrier and/or measurement object whether meet the condition of triggering measurements reporting or not, according to the message the receiver module received;

Send module, used for when judgment result of judgment module is true, UE reports measurement information of at least one component carrier and/or measurement information of at least one measurement object to the network side by measurement report message.

Compared with the present technology, the embodiment of the present invention at least has the following advantages:

UE can report measurement information of multiple carriers and/or frequencies together. Therefore, it simplifies the reporting process, reduces the system delay, and makes the network side easier to perform carrier management for LTE-A UE.

DETAILED DESCRIPTION OF THE EMBODIMENTS OF THE PRESENT INVENTION

In LTE-A system of the present invention, when the component carrier and/or measurement object meet the conditions of triggering report, UE can report the measurement information of at least one component carrier and/or the measurement information of at least one measurement object to the network side by measurement report message, so it simplifies the reporting process, reduces the system delay, and makes the network side easier to perform carrier management for LTE-A UE.

Figure 5:
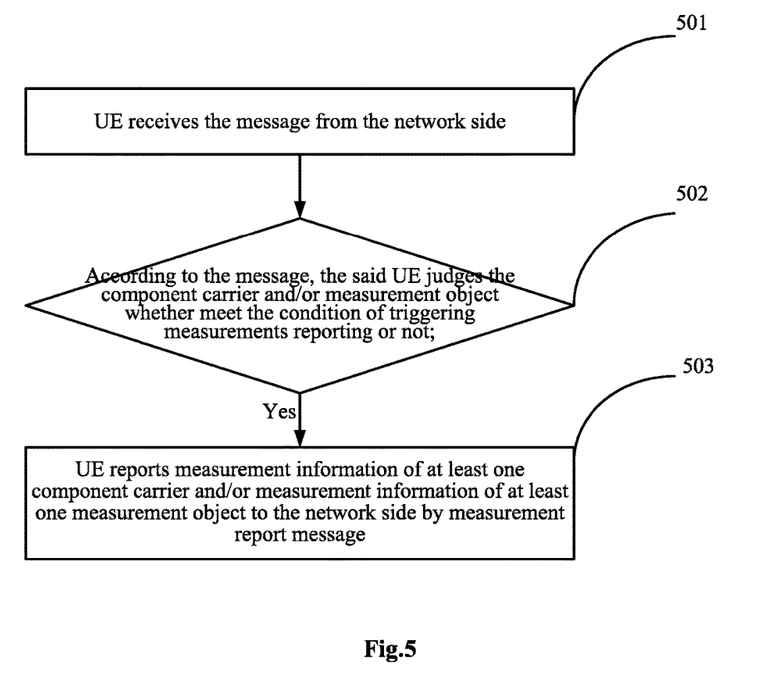
FIG. 5 is a flow schematic diagram of embodiment of the present invention one which provides a method of measurement reporting in CA system.

As shown in FIG. 5, embodiments of the present invention provide a method of measurement reporting in CA system, comprising:

Step 501, UE receives the message from the network side;

Step 502, according to the message, the said UE judges the component carrier and/or measurement object whether meet the condition of triggering measurements reporting or not;

Step 503, when judgment result is true, UE reports measurement information of at least one component carrier and/or measurement information of at least one measurement object to the network side by measurement report message.

Specifically, the reporting way of the said step 503 includes: The UE reports statistical measurement quantity or instantaneous measurement quantity of the carrier, which satisfy the conditions to trigger reporting, to the network side, or reports statistical measurement quantity or instantaneous measurement quantity of the frequency indicated by measurement object, which satisfy the conditions to trigger reporting, to the network side; Further, UE may also report statistical measurement quantity or instantaneous measurement quantity of other carrier to the network side, or reports statistical measurement quantity or instantaneous measurement quantity of other frequency indicated by measurement object to the network side.

The achieving ways of statistical measurement quantity include: by the formula $F_n=(1-a)\cdot F_{n-1}+a\cdot M_n$; wherein, $M_n$ is the measurement result received from physical layer recently; $F_n$ is the statistical measurement quantity; $F_{n-1}$ is the result conducted previous, when first measurement result is received from physical layer, $F_0$ is $M_1$; $a=\frac{1}{2}^{(k/4)}$, k is the value corresponding to the statistical measurement quantity, noticed by the network side; the achieved ways of instantaneous measurement quantity include the value is achieved from physical layer, for example: $M_n$.

Further, another reporting way of the said step 503 includes: UE reports measurement information of the carrier or the frequency indicated by measurement object, which satisfy the conditions to trigger reporting, to the network side, and reports measurement information of other carrier or other frequency indicated by measurement object, which satisfy pre-defined strategy, to the network side. Wherein, the said pre-defined strategy comprising: measurement quantity meets conditions to enter report lists, but does not reach the time of TimeToTrigger; or, measurement quantity meets conditions to trigger reporting, and still in the report lists; or, measurement quantity not only doesn't meet conditions to enter report lists but also does not reach the time of TimeToTrigger, or other conditions.

Other reporting way of the said step 503 includes: The UE reports carrier information and/or frequency information corresponding to measurement quantity to network side; the carrier information and/or frequency information can be indicated by measurement ID, cell ID, carrier ID or bitmap information; Wherein, said carrier information corresponding to measurement quantity is measurement information of component carrier, said frequency information corresponding to measurement quantity is measurement information of the frequency indicated by measurement object.

Specifically, multiple ways can be used for measurement object to indicate frequency information. For example, indicating the frequency value directly, indicating frequency value by the carrier ID or cell ID, etc. When UE has obtained the relationship between the frequency and its index, frequency information can be indicated by the ways of bitmap or others. For example, UE obtains the relationship between the frequency and its indexes are cell1 850 MHz, cell2 900 MHz, cell3 900 MHz, cell4 950 MHz, cell5 1000 MHz, then frequency information can be indicated by bitmap information 00111.

In addition, other reporting way of the said step 503 includes: UE reports measurement information of at least one component carrier and/or measurement information of at least one measurement object to the network side by measuring the reference frequency. At present, UE determines the measurement reference frequency; or, the network side determines measurement reference frequency, and notices it to UE. Further, the ways to determine measurement reference frequency, comprising: according to whether the measured component carrier and/or frequency is in corresponding frequency band to determine the measurement reference frequency.

In the present invention, said measurement information includes one or several of the measurement quantity, carrier ID, cell ID, measurement object ID and pre-defined strategy; said measurement quantity is the single measurement quantity of each carrier or frequency of indicated by measurement object or the measurement reference frequency, or the comprehensive measurement quantity of multiple carriers or frequencies indicated by measurement object or measurement reference frequencies.

Then, through using the method of the present invention, UE can report measurement information of multiple carriers and/or frequencies together. Therefore, it simplifies the reporting process, reduces the system delay, and makes the network side easier to perform carrier management for LTE-A UE.

Embodiments 2 of the present invention provide a method of measurement reporting in CA system, and it directs at the LTE-A system. Because in LTE-A system, the definition of serving cell is still not clear, To facilitate description, following definitions are used in embodiments of the present invention.

(1) The aggregated carrier of UE. The aggregated carrier of UE is the carrier which is allocated by network side to LTE-A UE for CA transmission. In the current specification, it points out the maximum number of aggregated carrier of LTE-A UE is 5. Wherein, each aggregated carrier can be defined as a serving cell, the frequency of serving cell is serving frequency; it can also multiple aggregated carriers correspond to a serving cell. Because the conception of serving cell in LTE-A is undetermined presently, "carrier" rather than "serving cell" is used to describe embodiments of the present invention. When "serving cell" is defined exactly, the content of present invention can also be described by "serving cell" according to the relationship between serving cell and carrier, that is, the description way of either "serving cell" or "carrier" can not influence the technical proposal of the present invention.

(2) Measurement reference point (or measurement reference frequency). To reduce the complexity of UE measurement, the present invention defines the conception of measurement reference point; wherein, each measurement reference point can correspond to the center frequency of a carrier or frequency band; or does not correspond to the center frequency of a carrier or frequency band but only corresponds to a designated frequency.

In the present invention, measurement reference point can be determined according to the frequency of aggregated carrier, also can be set directly; while the indicated frequency in measurement object can be the center frequency of carrier or frequency band, also can be measurement reference point. the measurement information of measurement report can be report based on the center frequency of carrier or frequency band, also can be based on measurement reference point.

Figure 6:
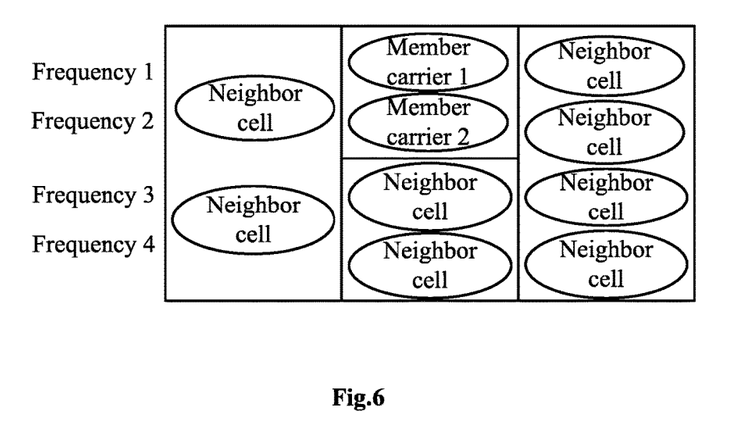
FIG. 6 is a schematic diagram of neighbor cells of the embodiment of the present invention.

(3) The neighbor cells corresponding to UE aggregated carrier, that is the other cells except the cell corresponding to UE aggregated carrier. Wherein, the neighbor cells can locate on different frequencies, and these frequencies not only can be the same with the frequencies corresponding to UE aggregated carriers, but also can be different from frequencies corresponding to UE aggregated carriers. As the schematic diagram of neighbor cells shown in FIG. 6; we can see that each frequency can have multiple neighbor cells.

Figure 7:
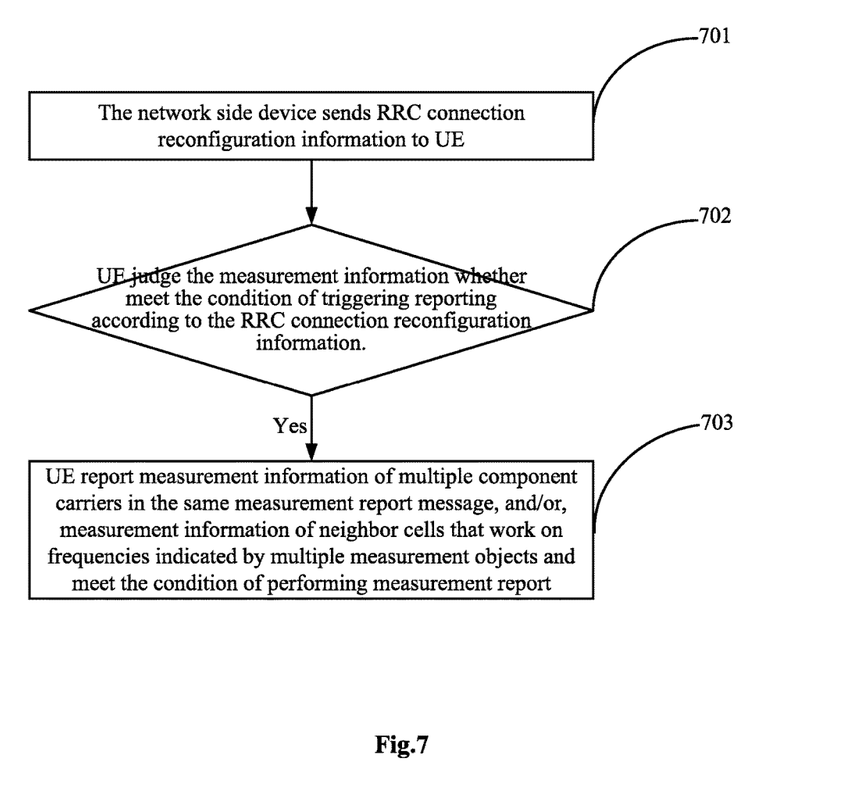
FIG. 7 is a flow schematic diagram of embodiment of the present invention two which provides a method of measurement reporting in CA system.

Based on the above concept, as shown in FIG. 7, the method of measurement reporting in this CA system, comprising:

Step 701, the network side device sends RRC connection reconfiguration information to UE. Wherein, the network side device includes but not limited to E-UTRAN, RNC (Radio Network Controller), NB (Node B), eNB (evolved-Node B), Relay, base station and so on. It should be noted that, the network side device doesn't be confined to the above devices, all of devices of network side may sent measurement configuration information to UE in the present invention within the scope of protection.

Specifically, the content of RRC connection reconfiguration information includes but not limited to one or any combination of the following contents.

a) Measurement object: With frequency as the basic unit, each configured measurement object is a independent frequency (or measurement reference frequency), has individual measurement object ID. Measurement object can indicate the frequency of carrier, list of 'blacklisted' cells and/or 'whitelisted' cell, the cell for which CGI needed to be reported, and others.

b) Report configuration: it can be divided into event triggered report and periodical triggered report by the trigger type, each report configuration has individual ID. Wherein, report configuration of event triggered report will configure the threshold value of event and duration (Time to Trigger) which meet the condition of triggering reporting, while report configuration of periodical triggered report will configure the purpose of periodical triggered report (for example, reporting CGI). Furthermore, the report configuration also can include triggered measurement quantity, reported measurement quantity, report interval, times of report and so on.

c) Measurement ID: each measurement ID can connect a measurement object with a report configuration at the same time, also can connect multiple measurement objects with a report configuration the same time. If reaching the threshold of performing measurement, UE will judge whether perform the measurement according to whether measurement ID exists.

d) Other parameters: may include configuration of measurement quantity, threshold of performing measurement, speed state and so on.

Step 702, UE judge the measurement information whether meet the condition of triggering reporting according to the RRC connection reconfiguration information. When the result is true, executing step 703, otherwise, end process. Wherein, the measurement information can be frequency indicated by measurement object and/or component carrier.

Specifically, when UE is configured multiple measurement objects, it needs to judge them whether meeting the condition of triggering reporting in the step; and/or, when UE is configured multiple component carriers, it needs to judge them whether meeting the condition of triggering reporting in this step.

In the present invention, measurement report has three kinds of trigger type, comprising: event triggered measurement report, periodical triggered measurement report and event triggered periodical measurement report. The said three kinds of trigger type can be distinguished according to combination of various parameters in report configuration in RRC connection reconfiguration information. Wherein, report configuration of event triggered report will configure the threshold value of event and duration (Time to Trigger) which meet the condition of triggering reporting, while report configuration of periodical triggered report will configure the purpose of periodical triggered report (for example, reporting CGI).

Further, the process judging whether multiple measurement objects and/or multiple component carriers meet the condition of triggering reporting including:

(a) Measurement evaluation, that is, UE finds the carrier which meet report configuration in a measurement object and/or a component carrier by performing measurement, and perform evaluation, when a carrier meets the condition for a certain time, it will be included in the report list; if a new carrier enter into the report list, report process will be triggered.

(b) Organizing reporting, that is the process to fill measurement report message, it need to fill measurement ID, the measurement information corresponding to UE aggregated carrier, measurement information of neighbor cells. Wherein, the process to obtain measurement information of neighbor cells can be to queue the cell in the report list which is under measurement evaluation quality according to the reported measurement quantity indicated in report configuration, and fill measurement report message according to the value of measurement quantity with from high to low principle.

Specifically, the number of neighbor cells in report list is determined by the following conditions: 1) the condition to enter report list: the measurement quantity of cell meet the rule to enter report list (e.g. the signal quality is greater than a certain threshold). 2) the condition to leave report list: the measurement quantity of cell meet the rule to leave report list (the signal quality is lower than a certain threshold). 3) the condition which should be met by cell to be included in report list: if a cell meet the conditions to enter report list for a certain time, then it will be included in the report list. 4) the condition which should be met by cell to be deleted from report list: if a cell meet the conditions to leave report list for a certain time, then it will be deleted from the report list. Wherein, when UE performs measurement report, it can report all the neighbor cells in the report list to network, and do not consider if it has been reported before.

Step 703, UE report measurement information of multiple component carriers in the same measurement report message, and/or, measurement information of neighbor cells that work on frequencies indicated by multiple measurement objects and meet the condition of performing measurement report.

Specifically, reporting measurement information of multiple aggregated component carriers, and/or, measurement information of neighbor cells that work on frequencies indicated by multiple measurement objects and meet the condition of performing measurement report can be implemented through measurement reference point.

Further, when a component carrier, which meet the condition of performing measurement report, performs measurement report, the obtained measurement quantity of other carriers includes but not limited to: (1) measurement quantity of other carriers is instantaneous measurement quantity; (2) measurement quantity of other carriers is statistical measurement quantity, for example, the results which is smoothed by timer or filter.

It should be noted that, each measurement report message can carry measurement information of multiple component carriers the same time, and/or, measurement information of neighbor cells that work on frequencies indicated by multiple measurement objects and meet the condition of performing measurement report, the content of measurement report message include but not limited to the following one or any combination:

a) measurement ID.
b) Carrier ID.
c) Frequency ID indicated by measurement object.
d) Measurement quantity. For example, RARP (Reference Signal Received Power) and RARQ (Reference Signal Received Quality).
e) PCI of neighbor cells which meet the conditions.
f) Whether report the measurement quantity and CGI of cell depends on if the information is configured by network for UE to report.

To describe the technical proposal of the present invention clearly, it will describe it by the following several specific application scenes.

Application scenario 1 is that multiple component carriers is configured for UE, and information of multiple component carriers is required to report when performing measurement report.

In this application scenario, the network side configures 4 component carrier for UE (which can be changed according to the need). That is CC1 (carried), CC2, CC3, CC4. Wherein, if the measurement event (e.g. A2 event) related to CC1 has met the condition of traggering (measurement) report, according to the need, UE can report the measurement quantity of CC1, CC2, CC3, CC4 at the same time. Wherein, the measurement quantity can be RSRP and RSRQ.

Specifically, in present LTE standard, the conditions of triggering report include meeting the entry conditions of enter the report list of measurement events, and meeting the time of Time To Trigger. In LTE-A, the conditions of triggering report also can add other contents, which will not be described with unnecessary details again in the present invention. An example is the conditions of triggering report is to meet the entry conditions of enter the report list of measurement events, and to meet the time of Time To Trigger. For example, all of CC1, CC2, CC3, CC4 have enter the report list of measurement events (A2 event), and CC1 has met the conditions of triggering report (i.e. meeting the time of Time To Trigger the same time), the UE can report the measurement quantity of CC1, CC2, CC3, CC4 at the same time.

In practical application, measurement report also can according to the predefined conditions (for example, meets conditions to enter report lists, but does not reach the time of TimeToTrigger; or, measurement quantity meets conditions to trigger reporting, and still in the report lists; or, measurement quantity not only doesn't meet conditions to enter report lists but also does not reach the time of TimeToTrigger, or other predefined conditions). When measurement report use measurement report message, only the information of component carriers which meet predefined condition need to be reported. For example, the predefined conditions is reporting measurement quantity of the component carrier which meets conditions to enter report lists (corresponding the same measurement event), but does not reach the time of TimeToTrigger. If in the 4 component carriers of UE, CC1 and CC2 meet conditions to enter report lists, and only CC2 meets the conditions of triggering report, thus only the measurement quantity information of CC1 and CC2 need to be reported.

It should be noted that, in above example, the situation of meeting conditions of triggering report but still being in report list is that: CC1 meets the conditions of triggering report, thus need report the measurement quantity of CC1. CC1 will be in the report list until it meeting the leaving conditions. In the follow-up process, if CC2 also meets the conditions of triggering report, then need to report the measurement quantity of CC2. Because of CC1 has been in the report list (that is CC1 has meet the conditions of triggering report and still in the list), also the measurement quantity of CC1 can also be reported at the same time, although it has reported before.

Application scenario 2 is that multiple measurement objects is configured for UE, and information of multiple measurement objects is required to report when performing measurement report.

In this application scenario, the network side configures 3 measurement objects for UE, the frequency information corresponding to measurement object and the measurement results of UE are shown in table 1,

TABLE 1

| measurement frequency | measurement result of UE |
|---|---|
| f1 | CID1 (label1), CID2 (label 2), CID3 (label 3), CID4 (label 3) |
| f2 | CID1 (label3), CID3 (label 2), CID4 (label 3), CID5 (label 3) |
| f3 | CID1 (label 3), CID2 (label 2), CID5 (label 2), CID6 (label 3) |

Wherein, label 1 means that the cell has been included in the report list; label 2 means that the cell meets partial conditions of triggering report (meet the entry conditions of accessing the measuring events reported list, but not meet the measurement quantity of the time of Time To Trigger); label 3 means that the cell does not meet any conditions. In table 1, CID can be PCI, CGI, or other identifications.

To the application scene that UE configured many measurement objects, the following divided into two kinds of cases specification.

First case:

To the CID1 of measurement frequency f1, because the cell has been included in the report list of corresponding frequency, according to the technological process of present LTE, CID1 of measurement frequency f1 will trigger report process. If the network side does not configure UE to report the measurement quantity and CGI of neighbor cell, then the reported information of UE is measurement ID, the measurement quantity of UE serving cell and neighbor cell physical ID (CID1). If the network side want to obtain measurement quantity information of another two measurement frequency f2 and f3 of which the cell ID is the same with that of CID1, it need to waiting until the cells corresponding to f2 and f3 enter the report list, then the measurement quantity information of f2 and f3 can be reported by UE.

But in the embodiments of the present invention, CID1 of measurement frequency f1 will trigger report process. If the network side does not configure UE to report the measurement quantity and CGI of neighbor cell, then UE reported contents include but not limited to: measurement ID, ID of UE aggregated carriers, the measurement quantity of one or several aggregated carriers (or the cells corresponding to the aggregated carriers) of UE used aggregated carriers, the measurement quantity of neighbor cell on f1 which meet conditions of measurement report, related measurement ID or frequency information (f2) and corresponding measurement quantity of CID1, related measurement ID or frequency information (f3) and corresponding measurement quantity of CID1.

Specifically, when reporting the measurement information of f2 and f3, measurement ID may not be carried. The frequency corresponding to multiple reported measurement quantity is notified to the network side by other ways, such as frequency information, the way of bitmap or the location of the reported measurement quantity.

It can be seen, in the embodiments of the present invention, although the CID1 of f2 and f3 does not enter the report list, UE will send the measurement quantity of CID1 on f1, f2 and f3 to the network side by a measurement report message, then sufficient information of CID1 is provided for network side in one measurement report message, which is good for network side to do handover judgment.

Similar to application scenario 1, in this application scenario, it also can perform report according to predefined conditions. When measurement report uses measurement report message, only the measurement information of the frequency which meet predefined condition need to be reported, which will not be described with unnecessary details again. Wherein, the preset conditions include but not limited to: meeting conditions to enter report lists, but not reaching the time of TimeToTrigger; or, meeting conditions to trigger reporting, and being still in the report lists; or, not only not meeting conditions to enter report lists but also not reaching the time of TimeToTrigger.

It should be noted that, the situation of meeting the conditions of measurement report but being still in report list is that: when the cell which is on the frequency indicated by measurement objects (e.g. f2) and is still in the report list is the cell which has been reported, if the cell that meet conditions of triggering report appears on the f1, then measurement quantity of cell corresponding to f1 need to be reported. Because the report list of f2 also exist the cell which meet the conditions of triggering report (that meet conditions of triggering report but is still in the report list), then the measurement quantity of the cell corresponding to f2 can be also reported at the same time.

Second case:

To the CID1 of measurement frequency f1, according to the technological process of present LTE, CID1 of measurement frequency f1 will trigger report process. If the network side does not configure UE to report the measurement quantity and CGI of neighbor cell, then the reported information of UE is measurement ID, the measurement quantity of UE serving cell and neighbor cell physical ID (CID1). If the network side wants to obtain measurement quantity information of another two measurement frequency f2 and f3 of which the cell ID is the same with that of CID1, it need to waiting until the cells corresponding to f2 and f3 enter the report list, then the measurement quantity information of f2 and f3 can be reported by UE.

But in the embodiments of the present invention, CID1 of measurement frequency f1 will trigger report process. If network side does not configure UE to report the measurement quantity and CGI of neighbor cell, then UE reported contents include but not limited to: measurement ID, the measurement quantity of one or several aggregated carriers (or the cells corresponding to the aggregated carrier) of UE used aggregated carriers, neighbor cell physical ID (CID1), related measurement ID or frequency information (f2) and corresponding measurement quantity of CID3, related measurement ID or frequency information (f3) and corresponding measurement quantity of CID2 and CID5.

Specifically, when reporting the measurement information of f2 and f3, measurement ID may not be carried. The frequency corresponding to multiple reported measurement quantity is notified to the network side by other ways, such as frequency information, the way of bitmap or the location of the reported measurement quantity.

It can be seen, in the embodiments of the present invention, although there is no cell on f2 and f3 entering the report list, UE will send the measurement quantity of related neighbor cell on f1, f2 and f3 to the network side by one measurement report message, then sufficient information of UE related neighbor cells is provided for network side in one measurement report message, which is good for network side to do handover judgment.

In practical application, when performing measurement report for the neighbor cell that meet conditions of triggering report on f2 and f3, the conditions of triggering report can be set according to actual need, for example, the conditions can be set as: 1) meeting conditions to enter report lists, but not reaching the time of TimeToTrigger; 2) meeting conditions to trigger reporting, and being still in the report lists; 3) not only not meeting conditions to enter report lists but also not reaching the time of TimeToTrigger; 4) other predefined conditions. When performing measurement reporting, only the information of the frequency which meet predefined condition need to be reported, which will not be described with unnecessary details again. It can be seen, the said process present an example in which the neighbor cell meets conditions to enter report lists, but not reaches the time of TimeToTrigger (that is the label 2 of table 1). The information of reported multiple frequencies which meet the conditions of measurement report include related measurement ID or frequency information (f2), and the measurement quantity of neighbor cell which meets conditions of measurement report (CID3), related measurement ID or frequency information (f3) and measurement quantity of related neighbor cell (CID2 and CID5).

Application scenario 3 is that multiple carriers and measurement objects is configured for UE. Information of multiple measurement objects and multiple carriers is required to report when performing measurement report.

In this application scenario, the network side configures 4 component carriers for UE which are CC1, CC2, CC3 and CC4. It also configures 3 measurement objects for UE. the frequency information corresponding to measurement object and the measurement results of UE are shown in table 2,

TABLE 2

| measurement frequency | measurement result of UE |
| --- | --- |
| f1 | CID1 (label 1), CID2 (label 2), CID3 (label 3), CID4 (label 3) |
| f2 | CID1 (label 2), CID3 (label 3), CID4 (label 3), CID5 (label 3) |
| f3 | CID1 (label 3), CID2 (label 2), CID5 (label 3), CID6 (label 3) |

Wherein, label 1 means that the cell has been included in the report list of corresponding frequency related to the measurement event of CC1; label 2 means that the cell meets partial conditions of trigger report of corresponding frequency related to the measurement event of CC1 (e.g. meeting the conditions to enter report lists corresponding to measurement event, but not reaching the time of TimeToTrigger); label 3 means that the cell does not meet any conditions of triggering report of the measurement event of any frequency corresponding to CC1. In table2, CID can be PCI, CGI, or cell ID.

In the embodiments of the present invention, CID1 of measurement frequency f1 will trigger report process. If the network side does not configure UE to report the measurement quantity and CGI of neighbor cell, then UE reported contents include but not limited to: measurement ID, the measurement quantity of multiple aggregated carriers (or the cells corresponding to the aggregated carriers) of UE used aggregated carriers, the measurement quantity of neighbor cell on f1 which meet conditions of measurement report, the measurement quantity of neighbor cell on f2 which meet conditions of measurement report, the measurement quantity of neighbor cell on f3 which meet conditions of measurement report.

Specifically, in this application scenario, the frequency corresponding to multiple measurement quantity can be notified to the network side by measurement ID, frequency information, the way of bitmap or the location of the reported measurement quantity. Although the CID1 of f2 and f3 does not enter the report list, and the report triggering of f1 only aim at CID1, UE will also send all the measurement quantity of all aggregated carriers and the measurement quantity of neighbor cell on f1, f2 and f3 to the network side by a measurement report message, which is good for network side to do handover judgment.

In practical application, when performing measurement report for the neighbor cell that meet conditions of triggering report on f2 and f3, the conditions can be set as: 1) meeting the entry conditions to enter report lists but not meeting the time of Time To Trigger; 2) meeting conditions to trigger reporting, and being still in the report lists; 3) not only not meeting conditions to enter report lists but also not reaching the time of TimeToTrigger; 4) other predefined conditions. When performing measurement reporting, only the information of the frequency which meet the condition need to be reported, which will not be described with unnecessary details again.

Application scenario 4, is a scenario that multiple carrier or/and multiple measurement objects is reported in the way of measurement reference frequency. In multicarrier system, if reporting in the way of measurement reference frequency is available, the method in the present invention can be adopted to deal accordingly.

First case: the component carrier is reported in the way of measurement reference frequency.

In this application scenario, the network side configures 4 component carriers for UE (which can be adjusted as needed), CC1,CC2,CC3,CC4. When said 4 component carriers are performing measurement or measurement report, the three measurement reference frequency of said 4 component carriers is P1, P2, P3. Therein, measurement reference frequency can be chosen according to the actual demand. For example, the reference frequency can be chosen according to whether the component carrier and/or frequency which perform measurement are in the same frequency band.

To be specific, the way of determining measurement reference frequency includes but is not limited to one or any combination of the following situation:

(1) Taking every component carrier as measurement reference frequency;

(2) Taking any one or several of the component carriers as measurement reference frequency;

(3) For continuous carriers, taking one of them as measurement reference frequency;

(4) Determining measurement reference frequency according to predefined strategy. For example, to reduce the cost of measurement report, determining only one measurement reference frequency for several carriers or frequencies. For example, averaging the frequency corresponding to multiple carriers, and taking the mean value as measurement reference frequency.

It should be noted that, the UE itself can determine a measurement reference frequency, and perform the associated report process according to the measurement reference frequency. In practical application, the measurement reference frequency also can be determined by the network side, and then noticed to UE. Wherein, the way that the network side informs UE of the measurement reference frequency includes but not limited to: 1) system broadcast; 2) dedicated signalling. Said dedicated signalling can specifically include: RRC signalling, MAC (Media Access Control) CE (Control Element) information, physical layer signalling etc.

After UE itself determines or/and acquires the measurement reference frequency through the network signalling, it reports the measurement information in the way of measurement reference frequency. The report process is similar to the report process in application scenario 1 in which component carrier is taken as unit (just report in the form of measurement reference frequency), which will not be described with unnecessary details again.

As the same, in this application scenario, measurement report can be performed according to predefined conditions (for example, meeting the entry conditions to enter report list, but not meeting the time of Time To Trigger, or, meeting the conditions of triggering report but being still in the reported list). When performing measurement reporting through measurement report information, only the measurement information of the frequency which meet the condition need to be reported.

It should be noted that, the measurement information corresponding to the measurement reference frequency, can be the measurement information that UE acquires through measuring the frequency indicated by the measurement reference frequency directly; when the measurement reference frequency is determined by multiple carriers, the measurement quantity information will be first determined, then the measurement quantity information corresponding to measurement reference frequency is calculated with the measurement quantity information of carriers.

In addition, when measurement report is triggered, the measurement reference frequency can be taken as the frequency of triggering report directly; when the measurement of measurement reference frequency is used to evaluate information of multiple carriers, triggering measurement report can be performed by one or several carriers (with the way of measurement reference frequency).

Second case, the measurement object uses measurement reference frequency to indicate and/or report.

In this application scenario, the network configure 4 measurement objects for UE, and the said measurement objects do measurement report base on 3 measurement reference point of P1, P2, P3. Wherein, the measurement reference point can be chosen according to whether the component carrier and/or frequency which perform measurement are in the same frequency band, comprising: (1) Taking every component carrier as measurement reference frequency; (2) taking any one or several of the component carriers as measurement reference frequency; (3) for continuous carriers, taking one of them as measurement reference frequency; (4) determining measurement reference frequency according to predefined strategy.

Specifically, the UE itself can determine a measurement reference frequency, and perform the associated report process according to the measurement reference frequency. In practical application, the measurement reference frequency also can be determined by the network side, and then noticed to UE. Wherein, the way that the network side informs UE of the measurement reference frequency includes but is not limited to: 1) system broadcast; 2) dedicated signalling. Said dedicated signalling can specifically include: RRC signalling, MAC (Media Access Control) CE (Control Element) information, physical layer signalling etc.

After UE itself determines or/and acquires the measurement reference frequency through the network signalling, it reports the measurement information in the way of measurement reference frequency. The report process is similar to the report process in application scenario 2 in which component carrier is taken as unit (just report in the form of measurement reference frequency), which will not be described with unnecessary details again.

Third case, the component carriers use the way of measurement reference point to report, and the measurement object uses measurement reference frequency to indicate and/or report. The process is similar to the reported process in scenario 3 (just report by the way of measurement reference frequency), which will not be described with unnecessary details again.

Application scenario 5, the following will, combining with the application scenarios, further describe the ways to the measurement quantity of the carrier or measurement object, when reporting the information of multiple carrier and/or measurement objects.

Specifically, when a component carrier or measurement object meets the conditions to report, there are two ways which can be used to determine the measurement quantity of carrier or measurement object:

(1) Measurement quantity of component carrier or measurement object is instantaneous measurement quantity;

(2) Measurement quantity of component carrier or measurement object is statistical measurement quantity, for example, the results which is smoothed by timer or filter.

For example, when the measurement event of component carrier1 (CC1) has met the conditions of triggering report, then the measurement quantity of CC1, CC2, CC3, CC4 can be reported at the same time. Wherein, for measurement report of CC1, the reported measurement result is statistical value, the achieving way of the statistical value use the way in LTE system, comprising:

$$F_n = (1-a) \cdot F_{n-1} + a \cdot M_n$$

$M_n$ is the measurement result received from physical layer recently;

$F_n$ is the measurement result conducted latest, it can be use for measurement reporting;

$F_{n-1}$ is the measurement result conducted previous, when first measurement result is received from physical layer, $F_0$ is $M_1$;

$a = \frac{1}{2}^{(k/4)}$, k is the value corresponding to the statistical measurement quantity, which can be notified by the network side.

Of course, in practical application, it also can use other ways to achieve the statistical value, which will not be described with unnecessary details again in this invention.

For the reported measurement quantity of CC2, CC3, CC4, both statistical value and instantaneous value can be used. The instantaneous value is obtained from physical layer directly, as: $M_n$.

So, through the method of the present invention, UE can report measurement information of multiple carriers and/or frequencies at the same time. Therefore, it simplifies the reporting process, reduces the system delay, and makes the network side easier to perform carrier management for LTE-A UE.

Figure 8:
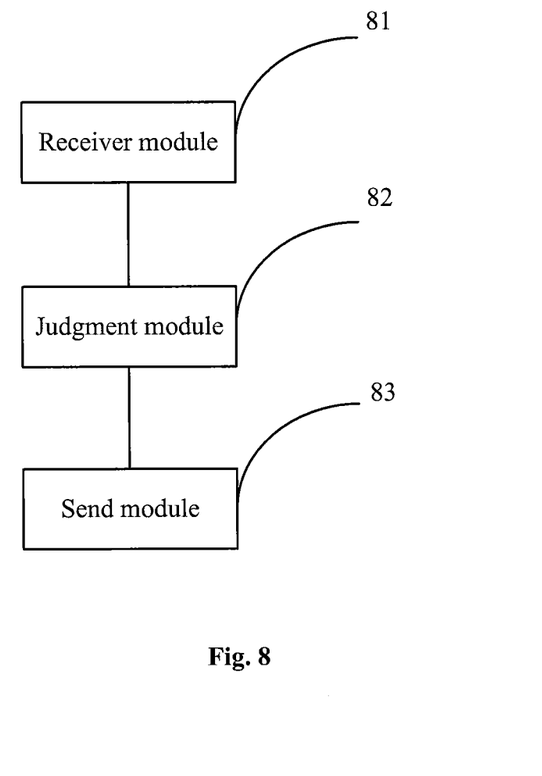
FIG. 8 is a structure diagram of embodiment of the present invention which provides a device of measurement reporting in CA system.

As shown in FIG. 8, embodiments of the present invention provide a device for measurement reporting in CA system, comprising:

Receiver module 81, used for receiving message from the network side;

Judgment module 82, used for judging component carrier and/or measurement object whether meet the condition of triggering measurements reporting or not according to the message the receiver module received;

Send module 83, used for when judgment result of judgment module is true, UE reports measurement information of at least one component carrier and/or measurement information of at least one measurement object to the network side by measurement report message.

Specifically, the said send module 83 is used for reporting statistical measurement quantity or instantaneous measurement quantity of the carrier or the frequency indicated by measurement object, which satisfy the conditions to trigger reporting, to the network side, and reporting statistical measurement quantity or instantaneous measurement quantity of other carrier or other frequency indicated by measurement object to the network side.

The said send module is also used for reporting measurement information of the carrier or the frequency indicated by measurement object, which satisfy the conditions to trigger reporting, to the network side, and reporting measurement information of other carrier or other frequency indicated by measurement object, which satisfy pre-defined strategy, to the network side. The said pre-defined strategy comprising: measurement quantity meets conditions to enter report lists, but does not reach the time of TimeToTrigger; or, measurement quantity meets conditions to trigger reporting, and is still in the report lists; or, measurement quantity not only doesn't meet conditions to enter report lists but also does not reach the time of TimeToTrigger, or other conditions.

The said send module is also used for reporting carrier information and/or frequency information corresponding to measurement quantity to network side; the carrier information and/or frequency information can be indicated by measurement ID, cell ID, carrier ID or bitmap information. Wherein, said carrier information corresponding to measurement quantity is measurement information of component carrier, said frequency information corresponding to measurement quantity is measurement information of the frequency indicated by measurement object The said send module is also used, for reporting measurement information of at least one component carrier and/or measurement information of at least one measurement object to the network side by measuring the reference frequency. The way achieving measurement reference frequency includes: UE determines the measurement reference frequency; or, the network side determines the measurement reference frequency, and notices it to UE. The ways determine measurement reference frequency, comprising: according to whether the measured component carrier and/or frequency is in corresponding frequency band to determine the measurement reference frequency.

In the present invention, said measurement information includes one or several of the measurement quantity, carrier ID, cell ID, measurement object ID and pre-defined strategy; said measurement quantity is a independent measurement quantity of each carrier or frequency indicated by measurement object or measurement reference frequency, or the comprehensive measurement quantity of multiple carriers or the frequencies indicated by measurement object or the measurement reference frequencies.

Wherein, each module of the present invention can integrate into a body, also can be deployed separately. The said module can integrate into a module, also can be separated into multiple submodule further.

It is thus clear that, by using the device of the present invention provided, UE can report measurement information of multiple carriers and/or frequencies together. Therefore, it simplifies the reporting process, reduces the system delay, and makes the network side easier to perform carrier management for LTE-A UE.

Through the description of the embodiments above, the technical personnel in this field can understand clearly that the present invention can be implemented by software and necessary current hardware platform. Of course can also through the hardware, but in many cases the former is better implementation ways. Based on this understanding, the technical program of the present invention or the part of contributing to the existing technology can be embodied by a form of software products which can be stored in storage medium, including a number of instructions for making a terminal device (such as mobile phone, personal computers, servers, or network equipments, etc.) implement the methods described in the embodiments of the present invention.

The technical personnel in this field can understand the figure is only a preferred diagram, the module or process of the figure is not the present should do.

The technical personnel in this field can understand the example of the device module can be according to the example to describe the distribution in the example in the device, also can undertake corresponding change is located in different from this example of one or more devices. The above example of the module can be integrated in a body, also can separate the deployment, can be combined into a module, can further fractionation with more than one module.

The above serial number of embodiments of the present invention is only for describing, and doesn't represent that the embodiment good or bad.

The above embodiments are only parts of the embodiments of the present invention, however, the embodiments of the present invention isn't limited to the above embodiments. Any change that the technical personnel in this field can think of should be belong to the scope of the patent protection of the embodiments of the present invention.

The invention claimed is:

1. A method for measurement reporting in a Carrier Aggregation (CA) system, comprising steps of:
   receiving, by a User Equipment (UE), a message from a network side device;
   determining, by the UE, whether one or more of a plurality of component carriers and/or one or more of a plurality of measurement objects meet a condition of triggering measurement reporting based on the message; and
   reporting, by the UE, measurement information of at least one of the plurality of component carriers and/or measurement information of at least one of the plurality of the measurement object to the network side device by one measurement reporting message if determining that the condition is met,
   wherein the step of reporting, by the UE, measurement information of at least one of the plurality of component carriers and/or measurement information of at least one of the plurality of the measurement objects to the network side device by one measurement reporting message comprises steps of:
   reporting, by the UE, statistical measurement quantity or instantaneous measurement quantity of component carriers in the plurality of component carriers and/or statistical measurement quantity or instantaneous measurement quantity of frequencies indicated by the measurement objects in the plurality of measurement objects to the network side device; and reporting, by the UE, statistical measurement quantity or instantaneous measurement quantity of the other component carriers in the plurality of component carriers and/or statistical measurement quantity or instantaneous measurement quantity of frequencies indicated by the other measurement objects in the plurality of measurement objects to the network side device, wherein the component carriers and the measurement objects meet the condition of triggering the measurement reporting; or
   reporting, by the UE, measurement information of component carriers in the plurality of component carriers and/or measurement information of frequencies indicated by the measurement objects in the plurality of measurement objects to the network side device; and reporting, by the UE, measurement information of one or more of the other component carriers in the plurality of component carriers and/or measurement information of frequencies indicated by one or more of other measurement objects in the plurality of measurement objects to the network side device, wherein the components carriers and the measurement objects meet the condition of triggering the measurement reporting, and the one or more of the other component carriers and/or the one or more of the other measurement objects satisfy a pre-defined strategy.

2. The method according to claim 1, wherein the pre-defined strategy comprises:
   the measurement quantity meeting a condition of enrolling into a reporting list, but not satisfying a time of TimeToTrigger; or
   the measurement quantity meeting the condition of triggering the measurement reporting, but remaining in the reporting list;
   the measurement quantity neither meeting the conditions to enter report lists but also does not reach the time of TimeToTrigger.

3. The method according to claim 1, wherein the step of reporting, by the UE, measurement information of at least one of the plurality of component carriers and/or measurement information of at least one of the plurality of the measurement objects to the network side device by one measurement reporting message comprises steps of:
   reporting, by the UE, carrier information and/or frequency information corresponding to the measurement quantity to the network side device, wherein the carrier information and/or the frequency information is identified by a measurement identification (ID), a cell ID, a carrier ID or a bitmap information in the carrier information and/or the frequency information,
   wherein the carrier information corresponding to the measurement quantity is the measurement information of the component carrier, and the frequency information corresponding to the measurement quantity is the measurement information of the frequency indicated by the measurement object.

4. The method according to claim 1, wherein the step of reporting, by the UE, measurement information of at least one of the plurality of component carriers and/or measurement information of at least one of the plurality of the measurement objects to the network side device by one measurement report message comprises a step of:
   reporting, by the UE, the measurement information of the at least one of the plurality of component carriers and/or the measurement information of the at least one of the plurality of the measurement objects to the network side device by a measurement reference frequency.

5. The method according to claim 4, wherein,
   the measurement reference frequency is determined by the UE; or
   the measurement reference frequency is determined and transmitted to the UE by the network side device.

6. The method according to claim 5, wherein
the measurement reference frequency is determined based on whether component carriers and/or frequencies being measured are within a same frequency.

7. The method according to claim 1, wherein
the measurement information comprises one or more of: a measurement quantity, a carrier ID, a cell ID, a measurement object ID and a pre-defined strategy; and
the measurement quantity is an independent measurement quantity determined by measuring each carrier, a frequency indicated by each measurement object or a measurement reference frequency, or the measurement quantity is a comprehensive measurement quantity determined by measuring carriers, frequencies indicated by measurement objects or measurement reference frequencies.

8. A device for measurement reporting in a Carrier Aggregation (CA) system, comprising:
a receiving module, configured for receiving a message from a network side device;
a determining module, configured for determining whether one or more of a plurality of component carriers and/or one or more of a plurality of measurement objects meet a condition of triggering measurements reporting based on the message received by the receiving module; and
a reporting module, configured for reporting measurement information of at least one of the plurality of component carriers and/or measurement information of at least one of the plurality of the measurement objects to the network side device by one measurement reporting message if the determining module determines that the condition is met,
wherein the reporting module is further configured for:
reporting statistical measurement quantity or instantaneous measurement quantity of component carriers in the plurality of component carriers and/or statistical measurement quantity or instantaneous measurement quantity of frequencies indicated by the measurement objects in the plurality of measurement objects to the network side device; and reporting statistical measurement quantity or instantaneous measurement quantity of the other component carriers in the plurality of component carriers and/or statistical measurement quantity or instantaneous measurement quantity of frequencies indicated by the other measurement objects in the plurality of measurement objects to the network side device, wherein the component carriers and the measurement objects meet the condition of triggering the measurement reporting; or
reporting measurement information of component carriers in the plurality of component carriers and/or measurement information of frequencies indicated by the measurement objects in the plurality of measurement objects to the network side device; and reporting measurement information of one or more of the other component carriers in the plurality of component carriers and/or measurement information of frequencies indicated by one or more of other measurement objects in the plurality of measurement objects to the network side device, wherein the components carriers and the measurement objects meet the condition of triggering the measurement reporting, and the one or more of the other component carriers and/or the one or more of the other measurement objects satisfy a pre-defined strategy.

9. The device according to claim 8, wherein the pre-defined strategy comprises:
the measurement quantity meeting a condition of enrolling into a reporting list, but not satisfying a time of TimeToTrigger; or
the measurement quantity meeting the condition of triggering the measurement reporting, but remaining in the reporting list; or
the measurement quantity neither meeting the condition of enrolling into the reporting list nor satisfying the time of TimeToTrigger.

10. The device according to claim 8,
wherein the reporting module is further configured for
reporting carrier information and/or frequency information corresponding to the measurement quantity to the network side device, wherein the carrier information and/or the frequency information is identified by a measurement identification (ID), a cell ID, a carrier ID or a bitmap information in the carrier information and/or the frequency information,
wherein the carrier information corresponding to the measurement quantity is the measurement information of the component carrier, and the frequency information corresponding to the measurement quantity is the measurement information of the frequency indicated by the measurement object.

11. The device according to claim 8, wherein the reporting module is further configured for:
reporting the measurement information of the at least one of the plurality of component carriers and/or the measurement information of the at least one of the plurality of the measurement objects to the network side device by a measurement reference frequency.

12. The device according to claim 11, wherein
the measurement reference frequency is determined by the UE; or
the measurement reference frequency is determined and transmitted by the network side device.

13. The device according to claim 12, wherein
the measurement reference frequency is determined based on whether component carriers and/or frequencies being measured are within a same frequency band.

14. The device according to claim 8, wherein
the measurement information comprises one or more of: the measurement quantity, a carrier ID, a cell ID, a measurement object ID and a pre-defined strategy; and
the measurement quantity is an independent measurement quantity determined by measuring each carrier, a frequency indicated by each measurement object or a measurement reference frequency, or the measurement quantity is a comprehensive measurement quantity determined by measuring carriers, frequencies indicated by measurement objects or measurement reference frequencies.

* * * * *